United States Patent [19]

Stauffer

[11] Patent Number: 4,575,764

[45] Date of Patent: Mar. 11, 1986

[54] VIDEO CAMERA AUTO FOCUS

[75] Inventor: Norman L. Stauffer, Englewood, Colo.

[73] Assignee: Honeywell Inc., Minneapolis, Minn.

[21] Appl. No.: 549,146

[22] Filed: Nov. 7, 1983

[51] Int. Cl.⁴ .................................................. G03B 3/00
[52] U.S. Cl. .................................... 358/227; 354/404; 250/201
[58] Field of Search ............... 358/227, 225; 354/404; 250/201

[56] References Cited

U.S. PATENT DOCUMENTS

| | | | |
|---|---|---|---|
| 2,999,436 | 9/1961 | Faulhaber | 354/404 |
| 3,833,806 | 9/1974 | Sato | 354/404 |
| 3,896,457 | 7/1975 | Yamanishi | 354/404 |
| 4,183,641 | 1/1980 | Kondo | 354/404 |
| 4,301,478 | 11/1981 | Sakane | 358/227 |
| 4,370,038 | 1/1983 | Kimura | 358/227 |
| 4,484,806 | 11/1984 | Onishi | 358/227 |
| 4,485,406 | 11/1984 | Brownstein | 358/227 |

Primary Examiner—Gene Z. Rubinson
Assistant Examiner—L. C. Schroeder
Attorney, Agent, or Firm—Charles J. Ungemach

[57] ABSTRACT

Focus detecting apparatus wherein an image of a remote object is focused by lens means on a detector array, and the exit pupil is oscillated to produce a dither signal in the output of the detectors having a magnitude indicative of the amount of out of focus and a sense indicative of the direction the lens means should be moved to achieve proper focus.

12 Claims, 9 Drawing Figures

VIDEO CAMERA AUTO FOCUS

This invention relates to a new type of auto focus system for a camera, especially a video or VTR type camera. One type of auto focus used in the past for VTR cameras uses relative contrast information derived from the video information. In such systems, when the contrast is maximum, the focus is optimum.

There are, however, a number of problems with such contrast sensing systems. Without moving the lens or the detectors to different positions, the system cannot determine if the contrast is maximum. Furthermore, without such motion between the lens and the detectors it is not possible to tell which direction to move to reach maximum contrast. Thus, prior art contrast sensing systems are subject to objectionable focus hunting. Another problem is that with contrast sensing systems there is difficulty finding the right focus position when the subjects are low contrast, low spatial frequency subjects since the motion of th lens or detectors must be quite large in order to detect significant contrast changes. The present invention overcomes these problems.

SUMMARY OF THE INVENTION

In the present invention, a small, but controlled, motion of the exit pupil of the lens is introduced as, for example, by translational dithering of an aperture between the lens, and the detectors in, perhaps, a sinusoidal fashion. The resulting change of position of the exit pupil causes a slight image motion or dither signal in the detector output for out of focus images but not in focus images. Out of focus images on one side of the proper focus position produce dither signals which are of an opposite sense to those produced by out of focus images on the other side of the proper focus position and the size of the dither signals relates to the magnitude of the out of focus condition. Accordingly, by analyzing the dither signals, the relative amount and direction the lens must be moved to achieve proper focus may be determined. In this manner, no motion of the lens or detectors is required, thus greatly improving the low object contrast problem and minimizing focus hunting.

DETAILED DESCRIPTION OF THE PREFERRED EMBODIMENT

Figure 1:
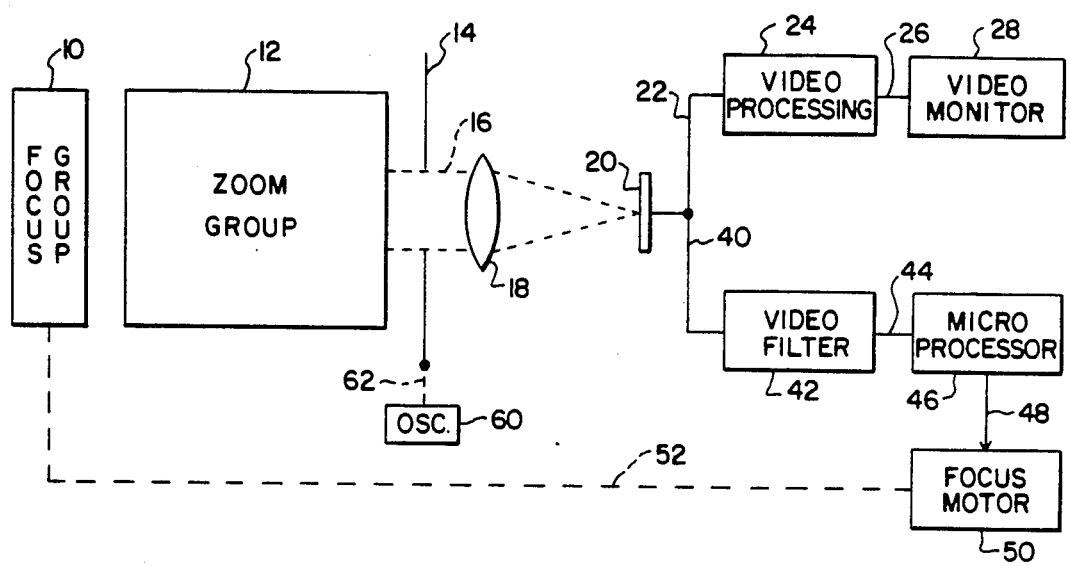
FIG. 1 is a schematic representation of a preferred embodiment of the present invention.

In FIG. 1, a video camera is shown comprising a focus group of lenses 10 in an optical path with a zoom group of lenses 12 mounted in front of an aperture 14 through which light from a remote object (not shown) is passed as shown by dash lines 16 to a master lens 18 which focuses an image of the remote object on a detector array 20 of the video camera. The output of the detector array is presented by a line 22 to the standard video processing apparatus 24 of the video camera which in turn may be connected by way of a line 26 to a video monitor 28 and/or a video tape recorder. Of course, if the object is not properly in focus, then the lens 18 does not sharply focus an image onto the detector array 20 and the image seen on the monitor would be blurred.

Figure 4:
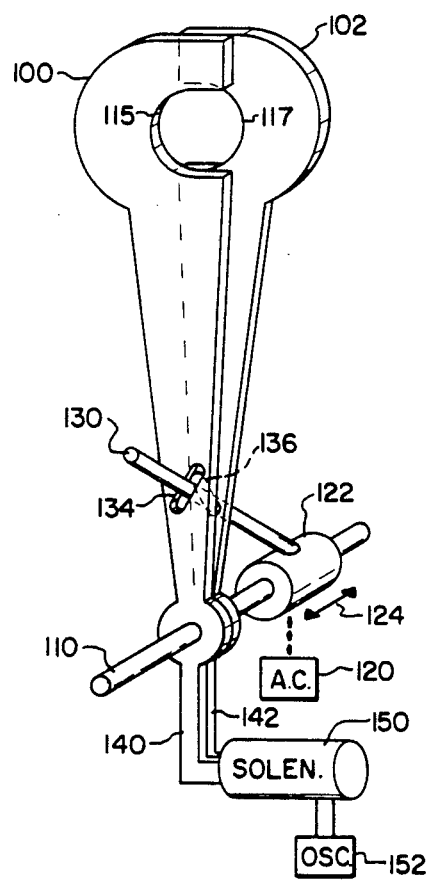
FIG. 4 is a representation of one type of aperture mechanism that might be employed in the present invention.

In order to assure that the object is continually in focus on the detector array 20, the output from the detector array 20 is also presented via a line 40 to a video filter 42 to isolate the dither signals from the detector output. Filter 42 may not be necessary in many applications where the dither signal is evident. The output of filter 42 is connected by way of a line 44 to a microprocessor 46 which determines, in a manner to be hereinafter described, the direction and amount of out of focus condition which may exist. The out of focus signal, if any, is presented by the microprocessor 46 on a line 48 to a focus motor 50 which is shown connected to position the focus group of lenses 10 by way of a mechanical connection shown as dash line 52. Also shown in FIG. 1, and to be more fully described in FIG. 4, is an oscillator device 60 connected to move the aperture 14 in a dithering fashion by means of a connection shown as dash line 62.

Figure 2A:
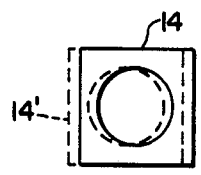
FIGS. 2a, 2b and 2c are representation of various ways of dithering the exit pupil.
Figure 2B:
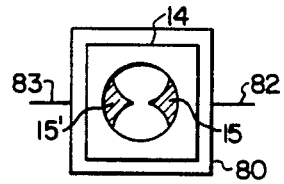
Figure 2C:
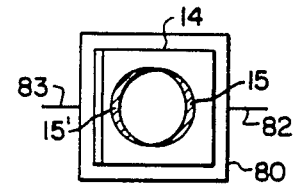

As an alternate to oscillating the aperture 14, it is also possible to electronically modulate the transmission of areas on opposite sides of the exit pupil as will be discussed in connection with FIGS. 2b and 2c. In such a case, the position of the aperture 14 would not change, but with an electronically controlled filter, for example, placed in the path between the lens zoom group 12 and detector array 20, the apparent position of the exit pupil on the detector array 20 would change slightly. In this latter method of operation, the modulation could be made at long wavelengths or in the near IR and thus extract the "red" color signal for focus information without bothering the image seen by the viewer.

Thus, in general, light from a remote object passes through the focus group of lenses 10, the zoom group of lenses 12, through the dithered aperture 14 (or the electronically modulated device) and the focus master lens 18 to be imaged on the detector array 20. This information is processed by the video processor 24 in the normal manner to produce an image on the monitor 28. The information is also presented through the video filter 42, if needed, and to the microprocessor 46 where the proper focus direction and position is determined and a signal to motor 50 accordingly operates to reposition the focus group 10 to the proper focus position.

It will be observed that the oscillation of the aperture 14 will cause the radiation from the zoom group of lenses 12 to move on the detector array 20 and thus produce a dither signal in the output of the detectors. It is desirable that the image motion be unnoticable on the monitor 28 so as not to bother the viewer and accordingly the dither motion may be made very slight, so as not to cause a visible variation to appear to the monitor. Alternately, the motion may be made very slow so as to be unobjectionable. FIG. 2a shows the oscillation of the aperture 14 from a solid line position to a dash line position 14' as the first method of introducing a variation in the position of the image on the detector array 20. FIG. 2b shows an exit pupil through the aperture 14 wherein electronically modulated areas 15 and 15' on opposite sides of the exit pupil have been introduced, for example, by a filter 80 energized by lines 82 and 83 and placed behind the aperture 14 in the light path defined by dashed lines 16 in FIG. 1. FIG. 2c shows an alternate pattern of introducing electronically modulated areas 15 and 15' on opposite sides of the exit pupil. In both FIGS. 2b and 2c, the opposite sides of the lens are alternately made opaque and then transparent so as to make the image the detectors see appear to move back and forth just as dithering the aperture 14 would do.

In all cases, the image on detector array 20 will move in a dithering fashion back and forth on the detector array so as to produce a dither signal in the output from the detectors in array 20.

Figure 3A:
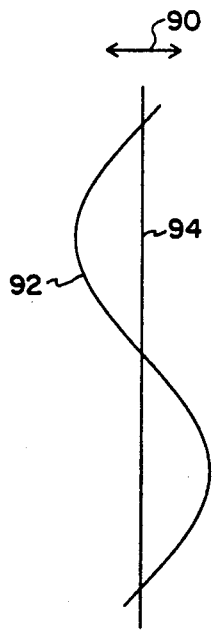
FIGS. 3a, 3b, 3c and 3d are wave forms showing the dither signals produced for various out of focus conditions.
Figure 3B:
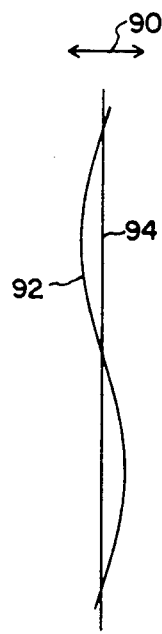
Figure 3C:
Figure 3D:
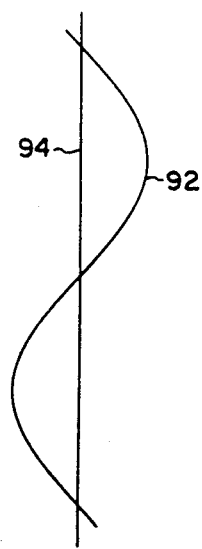

FIG. 3a shows how this dither signal might appear when there is exit pupil motion in back and forth directions as shown by arrow 90 and there is an out of focus condition in a first direction. A time varying signal shown by sinusoidal curve 92 will appear having the phase shown in FIG. 3a when the object is out of focus in the first direction. The magnitude of variation of the sinusoidal curve 92 about the central axis 94 will be an indication of the extent of out of focus condition. FIG. 3b shows the dither output when the object is still out of focus in the first direction but is much closer to the proper focus position. It is seen that the magnitude of the dither signal in FIG. 3b is less than in FIG. 3a. FIG. 3c shows the output at the proper focus position and it is seen that there is no dither signal in such an event. FIG. 3d shows the situation when the object is out of focus in a second direction or on the opposite side of the proper focus position from those cases shown in FIGS. 3a and 3b. It is seen that the sinusoidal curve is now 180 degrees out of phase from the way it was in FIGS. 3a and 3b. There are many devices available for detecting the magnitude and phase of a signal and it is accordingly a simple matter to determine from the dither signal the magnitude and direction in which the proper focus position lies with respect to the present position. Microprocessor 46 in FIG. 1 operates to determine this amount and direction and causes a signal of appropriate magnitude and sense to be presented by way of connection 48 to focus motor 50. Motor 50 adjusts lenses 10 in the proper direction to bring the object into proper focus on the image plane 20. Rebalance circuitry such as that seen in U.S. Pat. No. 4,333,007, assigned to the assignee of the present invention, may be used since the dithering effect herein described is substantially the same as the summation signals shown in FIG. 7 therein except that the signals from two sets of detectors in U.S. Pat. No. 4,333,007 are simultaneous whereas in the present invention the signals from the single set of detectors would be stored in a memory when the aperture was at one position and then later when the aperture was in an opposite position the signals from the detectors would be compared with the stored signals as if they had occurred simultaneously. Other apparatus for producing an output signal to drive motor 50 depending on the size and phase of the dither signal could also obviously be employed.

FIG. 4 shows one possible embodiment of an aperture mechanism which is dithered in the desired manner. In FIG. 4 a pair of blades 100 and 102 are mounted for sliding motion with respect to each other about a pivot formed by a rod 110. The blades 100 and 102 have, at their upper end a "U" shaped (for example) cut away portion 115 and 117 respectively so that as the blades slide together, the hole formed by the cut away portions 115 and 117 decreases in size and, vise versa, when the blades slide apart, the hole increases in size.

The position of the blades is controlled by an aperture control box 120 which may be manually or automatically operated in standard fashion to move a member 122 in the direction shown by arrows 124 along rod 110. An extension 130 from member 122 extends through slots 134 and 136 in the middle portion of blades 100 and 102 respectively so that as member 122 moves in the directions of arrows 124 the blades area caused to move together and apart to decrease and increase the size of the hole.

A lower extension 140 and 142 of blades 100 and 102 respectively cooperate with a solenoid 150 controlled by an oscillator 152 to produce the desired dither motion of both blades and thus the hole or aperture formed by the cut away portions 115 and 117.

It is thus seen that I have provided a novel apparatus for automatically focusing a camera and particularly a video camera. Many obvious changes will occur to those skilled in the art and I do not wish to be limited by the specific disclosures used in connection with the preferred embodiments. I intend only to be limited by the following claims.

I claim:

1. Focus apparatus comprising:
   radiation detector means;
   lens means for directing radiation from a remote object along a path to said radiation detector means, said lens means in a proper focus position producing a focused image of the object on said radiation detector means and said detector means producing an output signal indicative of the radiation received thereby;
   dithering means for producing oscillator motion of the image on said radiation detector means when said lens means is in other than the proper focus position so that a dither signal is introduced into the output signal, the dither signal having a magnitude indicative of the amount the lens means is away from the proper focus position and a sense indicative of the direction the lens means should be moved to the proper focus position.

2. Apparatus according to claim 1 wherein said said dithering means includes an aperture in the radiation path and oscillating means connected to said aperture.

3. Apparatus according to claim 1 wherein said lens means has an exit pupil with first and second oppositely arranged portions, and said dithering means comprises opaquing means connected to said lens means to alternately obscure the first and second portions.

4. Apparatus according to claim 1 including processor means connected to receive the output signal and to produce a drive signal in accordance therewith, and motor means connected to said processor means to move said lens means to the proper focus position.

5. Apparatus according to claim 2 wherein the dither signal is a sinusoidal signal of magnitude indicative of the magnitude of the out of focus condition and of a first phase when the lens means is on one side of the proper focus position and of opposite phase when the lens means is on the other side of the proper focus position.

6. Apparatus according to claim 3 wherein the dither signal is a sinusoidal signal of magnitude indicative of the magnitude of the out of focus condition and of a first phase when the leans means is on one side of the proper focus position and of opposite phase when the lens means is on the other side of the proper focus position.

7. Apparatus according to claim 4 wherein the dither signal is a sinusoidal signal of magnitude indicative of the magnitude of the out of focus condition and of a first phase when the lens means is on one side of the proper focus position and of opposite phase when the lens means is on the other side of the proper focus position.

8. Apparatus according to claim 1 wherein the dither signal is a sinusoidal signal of magnitude indicative of the magnitude of the out of focus condition and of a first phase when the lens means is on one side of the proper focus position and of opposite phase when the lens means is on the other side of the proper focus position.

9. Auto focus apparatus for use with a video camera having a lens system for directing radiation from a remote object along a path to produce an image of the object on a detector array having an output signal comprising:

dither means connected to the camera to cause a change in the path whereby the image moves in an oscillating fashion on the detector array when the remote object is out of focus to produce a dither signal in the output signal; and detection means connected to the detector array to receive the output signal and detect the dither signal as an indication of an out of focus condition.

10. Apparatus according to claim 9 wherein said lens system has an exit pupil and said dither means includes an aperture in the path which is oscillated back and forth to move the exit pupil.

11. Apparatus according to claim 9 wherein said dither means includes means electronically modulating radiation transmission areas alternately on opposite sides of the path.

12. Apparatus according to claim 9 wherein said detection means produces a focus signal from the dither signal and further including means connected to said detection means to receive the focus signal and operable in accordance therewith to move the lens system to produce a properly focused image of the remote object on the detector array.

* * * * *